J. BOTT.
WIND WHEEL.
APPLICATION FILED SEPT. 22, 1919.
1,379,439.
Patented May 24, 1921.
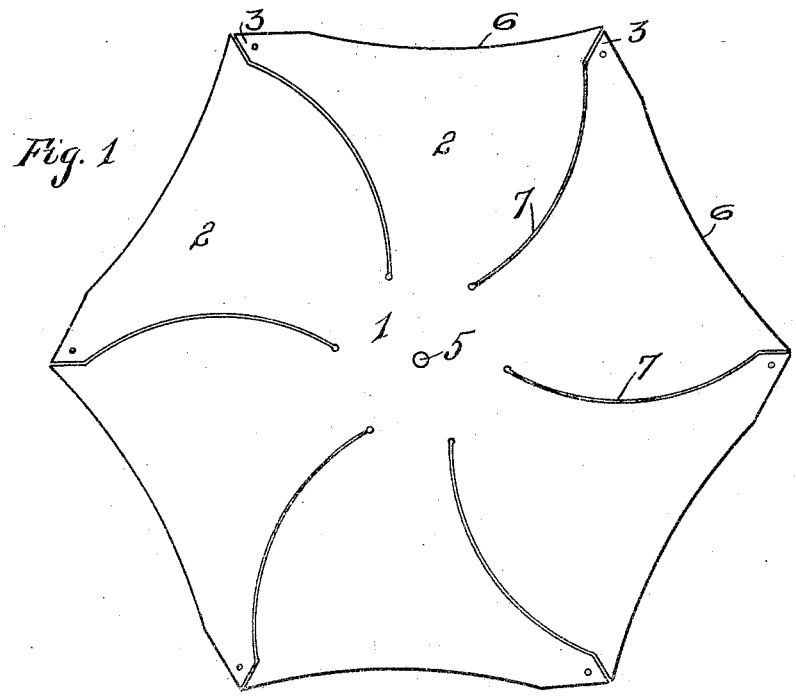
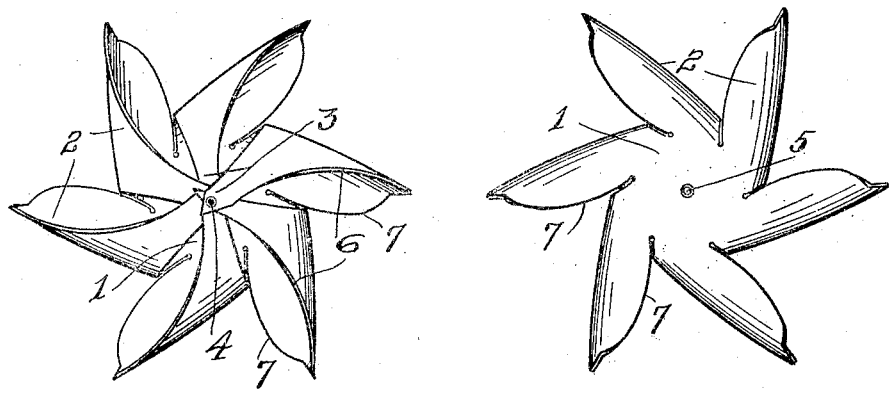
Fig. 2
Fig. 3
INVENTOR.
Joseph Bott
BY
Davis & Simms
his ATTORNEYS.

UNITED STATES PATENT OFFICE.

JOSEPH BOTT, OF ROCHESTER, NEW YORK, ASSIGNOR TO BASTIAN BROS. COMPANY, OF ROCHESTER, NEW YORK, A CORPORATION.

WIND-WHEEL.

1,379,439.   Specification of Letters Patent.   Patented May 24, 1921.

Application filed September 22, 1919. Serial No. 325,391.

*To all whom it may concern:*

Be it known that I, JOSEPH BOTT, a citizen of the United States, and resident of Rochester, in the county of Monroe and State of New York, have invented certain new and useful Improvements in Wind-Wheels, of which the following is a specification.

The present invention relates to wind wheels, and more particularly to the manner of forming the blank thereof, an object of the invention being to form a blank from a single sheet of material which will have a maximum number of blade producing portions and yet provide a sufficient air impinging surface on each blade for the purpose of producing rotation of the wind wheel.

To this and other ends, the invention consists of certain parts, and combinations of parts, all of which will be hereinafter described, the novel features being pointed out in the appended claims.

In the drawings:

Figure 1 is a plan view of a blank constructed in accordance with this invention;

Fig. 2 shows a front face view of a completed wind wheel; and

Fig. 3 shows a rear face view of the completed wind wheel.

Difficulty has heretofore been experienced in making a wind wheel from a single blank of sheet material with more than four blades. This has been due to the fact that blanks have heretofore been cut on radial lines and when more than four blade forming portions have been provided, the forward edge of each blade projects so far forwardly that it overlies the rear edge of the blade so that no impinging surface is provided with which the air may contact for the purpose of rotating the wheel.

According to this invention, the forward edge of each blade curves inwardly while the rearward edge curves or bulges outwardly so that sufficient wind impinging surface is provided on the blade.

In this embodiment of the invention the blank 1 is in the form of a hexagon and it is provided with curved slits leading from points near the center of the blank toward the corners of the hexagon to provide the blade forming portions 2. Each of the blade forming portions has its corner 3 brought over and secured by the eyelet 4 in line with the axis 5 of the wind wheel. Those portions of the blade forming portions of the blank between the slits are curved inwardly at 6. This inwardly curved portion forms the outer edge of the blade for the wind wheel while the inner or rear edge is formed by the bulged or outwardly curved edge 7 of the slit. Through this arrangement the wind or air is permitted to reach the curved portion of each blade of the wind wheel between the inwardly curved edge 6 and the rearward outwardly or bulged edge 7, thus giving sufficient wind impinging surface for turning the wind wheel.

What I claim as my invention and desire to secure by Letters Patent is:

1. A wind wheel formed from a blank of sheet material having between its blade producing portions slits with curved parallel walls.

2. A wind wheel formed from a blank of sheet material slitted to provide blade producing portions and having the edges of the blank between the slits curved inwardly.

3. A wind wheel formed from a blank of sheet material having between its blade producing portions slits with curved parallel walls and having the edges of the blade producing portions between the slits curved inwardly.

4. A wind wheel formed from a single blank of sheet material and having the outer edge of each blade formed on an inward curve and the rearward or inner edge formed on an outward curve.

5. A wind wheel formed from a hexagonal blank of sheet material provided between its blade producing portions with slits having curved parallel walls the edges of the blade producing portions between the slits being curved inwardly.

6. A wind wheel formed from a single hexagonally shaped blank of sheet material cut to provide six blades each having its forward or outer edge formed on an inward curve and its rear or inner edge formed on an outward curve.

JOSEPH BOTT.